United States Patent [19]

Plewka

[11] 4,175,280
[45] Nov. 20, 1979

[54] HEADLIGHT GLARE REDUCTION DEVICES FOR VEHICLES

[76] Inventor: Anna Plewka, Nahestr. 7, 4300 Essen-Kettwig, Fed. Rep. of Germany

[21] Appl. No.: 846,540

[22] Filed: Oct. 28, 1977

[30] Foreign Application Priority Data

Oct. 30, 1976 [DE] Fed. Rep. of Germany ....... 2649947

[51] Int. Cl.² ............................................... F21V 3/00
[52] U.S. Cl. ..................................... 362/61; 362/298; 362/238
[58] Field of Search .................... 362/302, 80, 61, 297, 362/298, 238

[56] References Cited

FOREIGN PATENT DOCUMENTS 1943640  8/1969  Fed. Rep. of Germany ............. 362/61
778653   6/1935  France ........................................ 362/80

Primary Examiner—Peter A. Nelson
Attorney, Agent, or Firm—Watson, Cole, Grindle & Watson

[57] ABSTRACT

In apparatus for reducing the glare of headlights of vehicles, at least one additional light is mounted adjacent to the vehicle headlights for lighting up the surroundings thereof. The additional light is mounted in a hollow body and includes reflectors mounted behind light sources and directed in all directions with the exception of the direction of travel of the vehicle, such that at least one reflector is directed parallel to the light emission surface of the vehicle headlights to floodlight the front part of the vehicle, its lateral surroundings as well as the area ahead of the vehicle.

8 Claims, 10 Drawing Figures

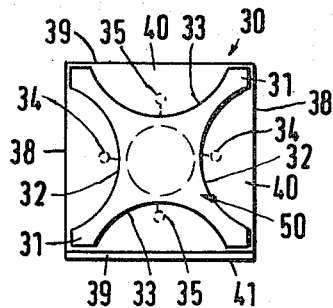
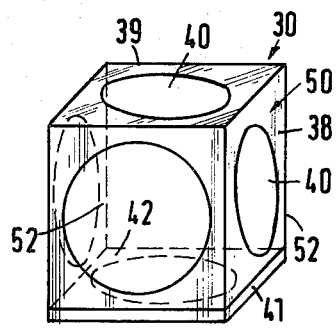
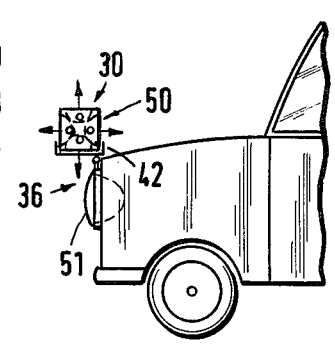
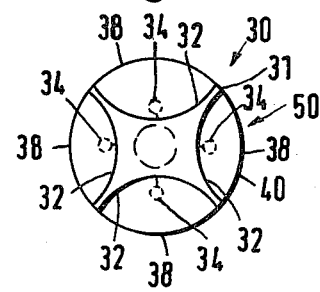
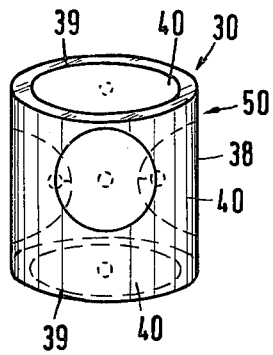
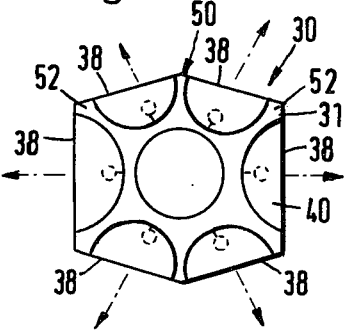
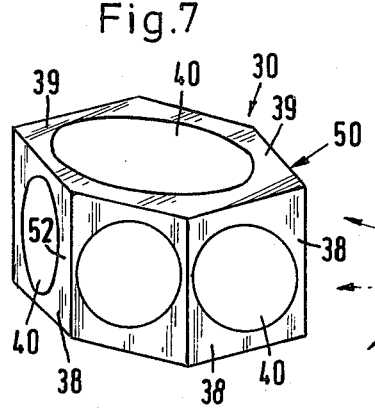
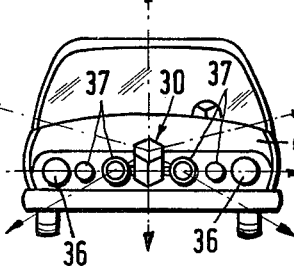
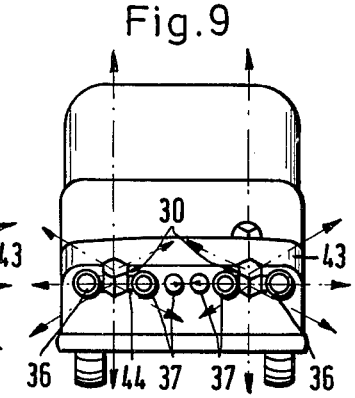
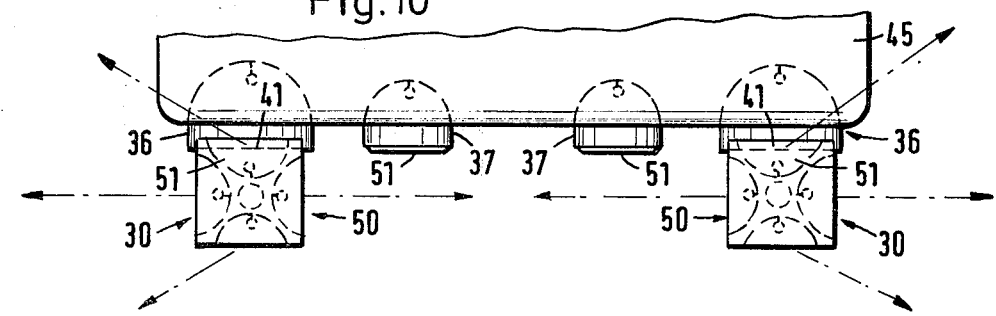

HEADLIGHT GLARE REDUCTION DEVICES FOR VEHICLES

BACKGROUND OF THE INVENTION

1. Field of the Invention

The invention relates to devices for reducing the glare of headlights of vehicles, particularly of motor vehicles, which include additional lighting for illuminating the surroundings of the headlight and designed and arranged in such a manner that it does not emit direct light in the direction of travel and is structurally combined with the headlight.

2. Prior Art

German Pat. No. 812,758 refers to an additional lamp which is attached laterally or above the main headlights of the vehicle in such a manner that the light rays of the additional lamp are emitted diagonally to the direction of travel in order to light the area on one side or on both sides of the vehicle.

Swiss Pat. No. 179,621 shows, besides the front headlights which can be dimmed and which produce a cone of light directed ahead, at least another such headlight attached laterally as a system to light the traveled path whose light beam has an opening up to at least 180° with border-line rays parallel to the respective side of the vehicle for the purpose of obtaining a consistent, practically uniform transition of the light rays of the lateral headlight with respect to those of the front headlight located on the same side of the vehicle.

According to German Pat. No. 901,631 an additional headlight system for motor vehicles consists of a headlight casing rigidly connected to the vehicle into which several headlights are fixed and can be, optionally, turned on or off. The additional headlights can light angular areas deviating from those of the headlights normally forming part of the vehicle equipment. Two additional headlights are fastened to the fenders, whereby all light emissions are effected laterally as well as upwardly and downwardly for driving on roads with numerous curves and steep hills.

In the case of such prior art devices, the disadvantages are that, even though they are installed laterally or above the headlights, or in the headlight or partially on the fender, they only emit light laterally or diagonally away from the vehicle or headlight and only cover a small area. Such lighting systems actually do not reduce the glare of the headlight at all or only reduce it very little. They do not have a corresponding design or respective arrangement of reflectors as, for example, for the purpose of floodlighting of the headlight itself and of the additional headlights as well as their surroundings. It is also known from DT-OS No. 2,018,440 that an additional light arranged on the motor vehicle only lights up the lateral dark area or floodlights parts of the vehicle.

SUMMARY OF THE INVENTION

Accordingly, it is an object of the invention to provide an improved multiple design for an additional light which is structurally combined with the headlight with regard to size and arrangement of the reflectors and light sources, the intensity of light and extent of light, construction, safety in traffic as well as to reduce glare in a practical application.

The problem is resolved in accordance with the invention in such a manner that the additional light has, in a hollow body, reflectors and light sources arranged towards all sides and aiming in all directions, with the exception of the direction of travel of the vehicle as well as the opposite direction. One additional light is attached to the front edge of a headlight, or, to the edge of several headlights by means of a mounting support whereby one reflector or several reflectors, respectively, of the additional light are always directed substantially in parallel to the light emission surface of the headlights in order to floodlight the front part of the vehicle and its lateral surroundings as well as the area ahead.

In comparison with existing systems, and with a distinct advantage for all pedestrians and motor car drivers, the glare of the headlight is considerably reduced by means of a compact design of the additional light in a hollow body, for example, in cubic form, with a concomitant effective arrangement as well as utilization of large reflectors besides suitable advanced electric bulbs and their considerably intensified overlapping and concentrated emissions towards all sides, except the direction of travel and the opposite direction, and into the near as well as further extended surroundings of the headlights and additional headlights as well as laterally up to the edges of the roads whereby all reflectors of the additional lamp are received in a simple manner by the smallest possible space. Also, the special arrangement of the additional light at the front edge of the headlight is of advantage whereby its light emission into a larger number of directions is made possible.

Additional advantages are the facts that now these intensifed, more extensive emissions, for the purpose of reducing the glare, are achieved with less but more suitably arranged reflectors as well as light sources of the additional lamp in the form of a hollow body, or even with only one additional light having an effect on all headlights and additional headlights of the front of the vehicle and its surroundings. Also, the additional light is designed in a practical construction and can be attached, in a permanent or detachable manner, to already existing headlights. Moreover, it can be swung back by means of a hinged bracket or it can be collapsible into the car body or its respective recesses. Furthermore, the additional lamp can, depending on the equipment of the vehicle, be fastened to the headlights as well as to the additional headlight at the front edge with an effect also on the respective other headlights and their surroundings. The large areas covering light emissions of the additional light—particularly in width, depth and height—are very advantageous during darkness and also on blind sections of roads because of the continuous possibility of recognizing the situation during travel whereby also the floodlighted front of the vehicle is clearly visible from far away.

Therefore, in the case of the first design of the additional light according to the invention, at least two sources of light opposite each other are arranged radially around the reflector of the headlight in an annular casing curvature open towards the inside and diagonally towards the front to emit light rays radially and crossing each other through the spreader glass of the headlight. In the case of the second embodiment for the additional light, an annular casing is arranged at a distance around the reflector of the headlight and connected to it by a transparent inner jacket and outer jacket for the emission of the light rays of at least three sources of light. The casing has a lighttight back and a partially light-transmissive opaque or tinted front for the purpose of light emission essentially radially in the direction away from the headlight towards the outside as well as, at the same time, radially in the direction towards the headlight and towards the inside, preferably in front of the light emission plane of the headlight. As an improvement, the inner jacket of the annular casing is designed as a reflector for the light sources of the additional light to floodlight the surroundings of the headlight and the additional headlights, and is arranged in about the same light emission plane, in radial directions away from the headlight.

In the case of the third embodiment of the additional light, a light source is arranged in the direction of travel centrally behind the headlight in a casing open towards the front and surrounding the headlight at a distance of at least 6 cm for light emission around the headlight diagonally towards the front.

The repeatedly intensified halogen light of the headlight requires an additional reduction of the glare. Thus, for example, the emission circle of all present additional lights, for the purpose of reducing the glare of the headlights, is, under present conditions too small and does not give enough light. Therefore, light conditions, similar to those of the daylight, must be created far around the headlight.

BRIEF DESCRIPTION OF THE FIGURES

FIG. 1 shows a section of the additional light in a lateral view;

FIG. 2 shows additional light from outside in a perspective view;

FIG. 3 shows additional light in a smaller scale with the headlight on the vehicle in a lateral view;

FIG. 4 shows a section of the additional light in a top view;

FIG. 5 shows additional light from outside in a perspective view;

FIG. 6 shows a section of the additional light in a top view;

FIG. 7 shows additional light from outside in a perspective view;

FIG. 8 shows a single additional light in a smaller scale as two headlights among several headlights;

FIG. 9 shows another embodiment with the additional light mounted on both sides of the front of the vehicle in a frontal view; and FIG. 10 shows two additional lights, each in cubic form according to FIGS. 1-3, with lateral emission directions in a top view.

According to the embodiment of FIGS. 1-3, additional lamp 30, designed in cubic form in a hollow body, of the headlight 36 has a casing containing the electrical installation, which is, if possible, of light metal, with four square surfaces 38, 39 attached laterally as well as horizontally towards each other and two such surfaces arranged on top and at the bottom vertically towards each other. Each of the square surfaces has a minimum size of 12×12 cm as well as a large reflector 32, 33 and a suitable advanced source of light 34, 35.

In front of the reflectors 32, 33, a transparent, or in the front and in the rear, a partially or slightly lightly tinted, preferably opaque, individual glass 40 is attached as a closure to emit the light rays. Instead of using individual glasses 40, casing 31 can be fully enclosed by a somewhat bigger cubic outside casing also of transparent or partially slightly tinted material which, for the purpose of opening it, consists at least of two parts and is designed in such a manner that, for example, the combined upper surfaces are combined to form a hood which is pushed over its lower, horizontally arranged reinforced surface with turned-up edges and is fastened and sealed.

The complete cubic additional light 30 is, at its lower part 41, mainly at the rear lower edge, structurally combined or connected with the front edge of the headlight 36, predominantly above and projecting towards the front beyond the headlight with its surface, either in a rigid or detachable fashion by means of a simple holding device or, preferably, by means of a hinged device 42. This hinged device is not shown in detail in the drawing. The combination or connection is effected in such a manner that lower reflector 33 is located during operation above the emitting cone of light of the headlight, i.e., in front of the headlight 36 pointing from above and parallel to its emitting light surface towards the bottom. The hinged device 42 has, for example, an enclosing ring for the headlight at one end, and at the other end, either a low square base frame of a light suitable material for the fastening of the cubic additional light 30. Alternatively, it has a cubic insertion frame consisting at least of two parts for the purpose of receiving the complete additional light 30 by enclosing it on all its edges or suitable points and for the purpose of easily dismounting it. Furthermore, the additional light is designed so that it can be swung down towards the vehicle body or telescoped into a recess of the vehicle body by means of the hinged device and, thus, it can be made less visible after it has been used.

All reflectors 32, 33 with light sources 34, 35 of additional light 30 radiate, predominantly in less strong bundles, through transparent individual glasses 40 or transparent surfaces of the outer casing into the near and extended surroundings of headlight 36 by being slightly inclined at the front and rear. The light sources also radiate diagonally to the respective side of the road and also illuminate the front of the vehicle, being slightly inclined at the left and right diagonally to the direction of travel, and far up to the edges of the roads, also towards the top and, at the same time, towards the front of vehicle 43, towards the bottom parallel to light emission surface 51 of headlight 36. Additional light 30 is automatically turned on with any long distance light and dimmed light and has a glare-reducing effect on headlight 36 whereby it is switched to a less strong light in city traffic, or it is entirely switched off.

No direct light is emitted from the additional light in the direction of travel and in the direction opposite to the direction of the persons in the vehicle in order to avoid additional glaring. In spite of this, a slight and partially light tinting of the front and rear transparent glass or of the outer casing is provided. The additional light 30 freely exceeds, if possible, the height of the motor hood in order not to be in the way of respective radiation diagonally towards the back.

When there are two or more headlights 36, 37 at the front part 43 of the vehicle, then predominantly the two additional lights 30 attached to the two main headlights 36 result in a particularly strong as well as extensive illumination owing to the fact that reflectors 32 are respectively located on the left and on the right radiate at least twofold into the lateral directions, which are important for the reduction of the glare, up to the edges of the roads whereby the additional headlights 37 are also hit at least twice in a glare-reducing manner. A maximum of two additional lights is required at the front part of the vehicle, independently of the number of headlights.

The illumination by the different reflectors of the additional light is coordinated in an overall manner and has an effect around all headlights so that otherwise unpleasant light-dark areas are avoided. The particularly large and light extent of the radiation dissolves the glare of the headlights.

As a modification of the cubic additional light, the corners and edges are rounded off of the device for the installation of more reflectors as well as light sources is enlarged in its height or width for the purpose of other emission directions. Individual surfaces of the casing can be designed for two reflectors with one light source each and emission directions different from each other.

It is easy to install the additional lights either rigidly or also with the possibility of folding them down by means of holding devices on already existing headlights. In the case of motorcycles, a light tinting of the upper and rear glass is provided on the additional light, or it must be sufficiently covered.

The additional light 30 can either be arranged in the front at the edge of the headlight 36, or in the same manner as the additional headlight 37 by means of a holding device and is always in front of the headlight plane. In the case of two additional lights 30 on the motor vehicle, it is not required that the front and rear reflectors 32 radiate diagonally towards the respective side of the road in order to avoid light rays in the direction of travel and in the opposite direction, but they can each aim diagonally to the opposite side of the road by crossing each other. Instead of one holding device, two holding devices of a lighter construction may be expedient for one headlight.

The additional light 30 according to FIGS. 4 and 5 are cylindrical in form and according to FIGS. 6 and 7 are hexagonal form has each a size, design, arrangement, holding device and light emission matching the cubic form. However, as a modification and an advantage, the hexagonal form has two front sides 38 each arranged at an angle towards the outside and towards the other and two such rear sides 38 with each having two separate light emissions diagonally towards the front or diagonally towards the back, whereby the two lateral surfaces of the road as well as the edges are still more intensely illuminated covering a larger area as is the front of the vehicle as well as the surroundings themselves which becomes particularly noticeable by the additional lights on two headlights of the largest motor vehicle. Also in the case of the hexagonal form, the corners and edges can be rounded off.

As is apparent from FIG. 8, a single additional light 30, preferably in the hexagonal form, is arranged with its rear lateral part 52 at the edges in front laterally between two different headlights 36, 37 at the front of the vehicle 43 and in the center of the front of the vehicle, on the one hand, which is generally sufficient to strongly reduce the glare and saving cost and energy. Whereas, on the other hand, according to FIG. 9, an identical additional light 30 is attached at the edge laterally in front between two headlights 36, 37, i.e., on both sides of the front of the vehicle 43. This additional light 30 is structurally combined or connected with the respective two headlights or additional headlights by means of a rigid or detachable holding device 44 and this in such a manner that it is located at about the same level as well as between their cones of light to be emitted and has a strong glare-reducing effect by floodlighting all headlights or additional headlights existing in about the same light emission plane of the front of the vehicle and also their surroundings whereby always two lateral reflectors 32 of the additional lights 30 are directed from a lateral position parallel to the light emission surface 51 of the respective headlights 36, 37.

According to FIG. 10, there are lateral emission directions of two cubic additional lights 30 of separate main headlights 36 located at the front part of the vehicle 45 having also an effect on the additional headlights 37 when looked at from above.

It is possible to manufacture the additional light in the form of a can with a screw cover of a thin, particularly resistant and distortion-free material at low cost.

What is claimed is:

1. Apparatus for reducing the glare of headlights of vehicles, comprising:
at least one additional light for lighting up the surroundings of the vehicle headlight and being mounted such that it does not emit direct light in the direction of travel and is structurally combined with the headlight, said additional light being mounted in a hollow body, reflectors mounted behind light sources and directed towards all sides and aiming in all directions with the exception of the direction of travel as well as the opposite direction and that said at least one additional light being attached to the front edge of a vehicle headlight by means of a mounting support, whereby at least one reflector is directed substantially parallel to the light emission surface of the vehicle headlights to floodlight the front part of the vehicle, its lateral surroundings as well as the area ahead.

2. Apparatus according to claim 1, wherein said at least one additional light has at least four sides and further comprising a non-transparent casing with one reflector and light source inserted into each side and transparent lenses are arranged in front of the reflectors as covers to permit emission of the light rays into lateral directions as well as to the top and bottom and said sides each have individual surfaces of at least 12×12 cm.

3. Apparatus according to claim 1 wherein said at least one additional light is attached by its lower part to a vehicle headlight predominantly above in front of the edge thereof by means of a rigid, detachable holding device and a lower reflector of the additional light is located above the emitting cone of light of said vehicle headlight and points in front of the headlight towards the ground.

4. Apparatus according to claim 1 wherein said at least one additional light is designed to be swung back to the body of the vehicle by means of said holding device.

5. Apparatus according to claim 1 wherein said vehicle includes several headlights and said at least one additional light is mounted laterally at the front edges between said two headlights by a rigid detachable holding device, whereby the left and right reflectors of said at least one additional light point always in a lateral direction in front of said headlights.

6. Apparatus according to claim 2 wherein each casing surface includes more than one reflector with light source having a different direction of emission.

7. Apparatus according to claim 1 wherein said at least one additional light is controlled in accordance with the headlight and including means for independently switching said at least one additional light to a less strong light in city traffic or entirely switching said at least one additional light off.

8. Apparatus according to claim 1 wherein said at least one additional light has a hollow body form.

* * * * *